United States Patent
Kuekes et al.

(10) Patent No.: US 7,545,999 B2
(45) Date of Patent: Jun. 9, 2009

(54) PHOTONIC CONFIGURATION

(75) Inventors: Philip J. Kuekes, Menlo Park, CA (US); Theodore I. Kamins, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 367 days.

(21) Appl. No.: 11/264,206

(22) Filed: Nov. 1, 2005

(65) Prior Publication Data

US 2007/0096231 A1    May 3, 2007

(51) Int. Cl.
*G02B 6/12* (2006.01)
*G02B 6/42* (2006.01)

(52) U.S. Cl. .............. 385/14; 385/15; 385/30

(58) Field of Classification Search ........... 385/14, 385/16, 30
See application file for complete search history.

(56) References Cited

U.S. PATENT DOCUMENTS

| | | | | |
|---|---|---|---|---|
| 4,861,976 A | * | 8/1989 | Jewell et al. | 257/21 |
| 5,875,384 A | * | 2/1999 | Peill et al. | 422/186.3 |
| 6,005,791 A | * | 12/1999 | Gudesen et al. | 365/114 |
| 6,051,194 A | * | 4/2000 | Peill et al. | 422/186 |
| 6,310,991 B1 | | 10/2001 | Koops et al. | |
| 6,455,872 B1 | * | 9/2002 | Williams et al. | 257/14 |
| 6,657,222 B1 | * | 12/2003 | Foden et al. | 257/13 |
| 6,683,294 B1 | * | 1/2004 | Herbert et al. | 250/214 R |
| 6,987,269 B2 | * | 1/2006 | Janos et al. | 250/372 |
| 2002/0181827 A1 | | 12/2002 | Johnson et al. | |
| 2004/0113089 A1 | * | 6/2004 | Janos et al. | 250/372 |

FOREIGN PATENT DOCUMENTS

| | | |
|---|---|---|
| EP | 1045436 | 10/2000 |
| JP | 61256320 A * | 11/1986 |

* cited by examiner

*Primary Examiner*—K. Cyrus Kianni

(57) ABSTRACT

An apparatus comprising an integrated circuit having a plurality of devices each having device characteristics, and a waveguide structure coupled to the integrated circuit, wherein photons provided to the waveguide structure are directed to one or more devices of the plurality of devices and can alter the device characteristics of the device or devices.

16 Claims, 4 Drawing Sheets

PHOTONIC CONFIGURATION

FIELD OF THE INVENTION

The invention relates generally to the field of integrated circuits using semiconductor devices, and more specifically, to selectively altering device characteristics in a semiconductor device.

BACKGROUND

In recent years, there has existed a continuous trend toward building smaller, faster electronic devices (e.g., transistors). Today extremely small and extremely fast devices are created on integrated circuits that allow for powerful yet small and lightweight computing components. Typically these electronic devices are transistors, for example metal-oxide-semiconductor (MOS) transistors and similar transistors that may include other insulators as well as oxide.

One issue that arises from building ever smaller and faster devices is that these devices often tend to allow some leakage of current through the device when the device is biased OFF. For example, in an MOS transistor, leakage of current can occur through the channel that resides between the source and drain due to the very short length of the channel. Similar issues arise in other types of devices. Construction of small devices often requires a trade off in that very fast devices tend to have high leakage current, while devices with lower leakage current tend to be somewhat slower (e.g., very fast MOS transistors often have lower threshold voltages, and therefore more residual mobile charge in the channel at a zero gate voltage, which produces higher leakage current, while slower devices often have higher threshold voltages and thus less leakage current). Additionally, very fast devices tend to use higher amounts of power than slower devices (e.g., slower MOS transistors have higher threshold voltages and therefore less power is drawn when they are biased OFF and the current and power are lower when the device is biased ON).

The parameters of devices such as MOS transistors are typically configured by controlling the threshold voltage of the channel between the source and drain terminals. One factor typically used to determine the threshold voltage is the doping levels chosen during the manufacturing process. The doping process can typically require multiple masks and multiple dopant additions to achieve the desired device characteristics, which can increase the cost to manufacture the device. Additionally, as devices continually become smaller, statistical variations between devices typically become increasingly larger. Often it is difficult to control parameters such as the doping concentrations and channel length on very small devices with sufficient accuracy to ensure that the desired device characteristics are achieved. Furthermore, over time the device characteristics can change. Time as well as thermal and electrical exposure can alter the threshold voltage of a device.

SUMMARY

A method and apparatus for altering device characteristics on an integrated circuit is provided. In an illustrative implementation, the apparatus comprises an integrated circuit having a plurality of devices each having device characteristics, and a waveguide structure coupled to the integrated circuit, wherein photons provided to the waveguide structure are directed to one or more devices of the plurality of devices and can alter the device characteristics of the device or devices.

BRIEF DESCRIPTION OF THE DRAWINGS

For the purpose of illustrating the invention, there is shown in the drawings one exemplary implementation; however, it is understood that this invention is not limited to the precise arrangements and instrumentalities shown.

DETAILED DESCRIPTION

Overview

Because the threshold voltage of a transistor is typically determined during manufacturing, it is necessary for a chip designer to specify the optimal properties of the device before the device is made. Should a change in an application make it desirable to use devices with different properties (e.g., slower devices with higher threshold voltages that have lower current leakage instead of devices with lower threshold voltages and higher speeds that have higher current leakage), a physical replacement of the chips containing the devices is required. It would be desirable to have the ability to reconfigure the device properties after manufacture to tailor the various devices to specific applications. In addition, the ability to set the threshold voltage of various devices within a circuit to different values would allow for the functionality of the circuit to be improved. Currently, setting different threshold voltages for various transistors within a circuit using conventional methods requires additional and often costly masks and process steps. Furthermore, the ability to reconfigure devices after manufacture would allow devices that have degraded over time to be "reset" to their original condition. The ability to adjust the device characteristics after manufacture also allows variations that arise during the manufacturing process to be compensated for after manufacture so that the devices can maintain uniform characteristics. It would be desirable to be able to perform such alterations of the device characteristics during circuit operation, thus allowing applications to optimize the desired device characteristics upon execution of the application, or even continuously during operation.

An additional concern with transistors typically used today is that they can become damaged or non-functional when a charge becomes trapped in or near the channel. This trapped charge may cause the device to function improperly. It would be desirable to have the ability to repair such devices by removing or compensating for trapped charges.

Photonic Control Technique

Figure 1:
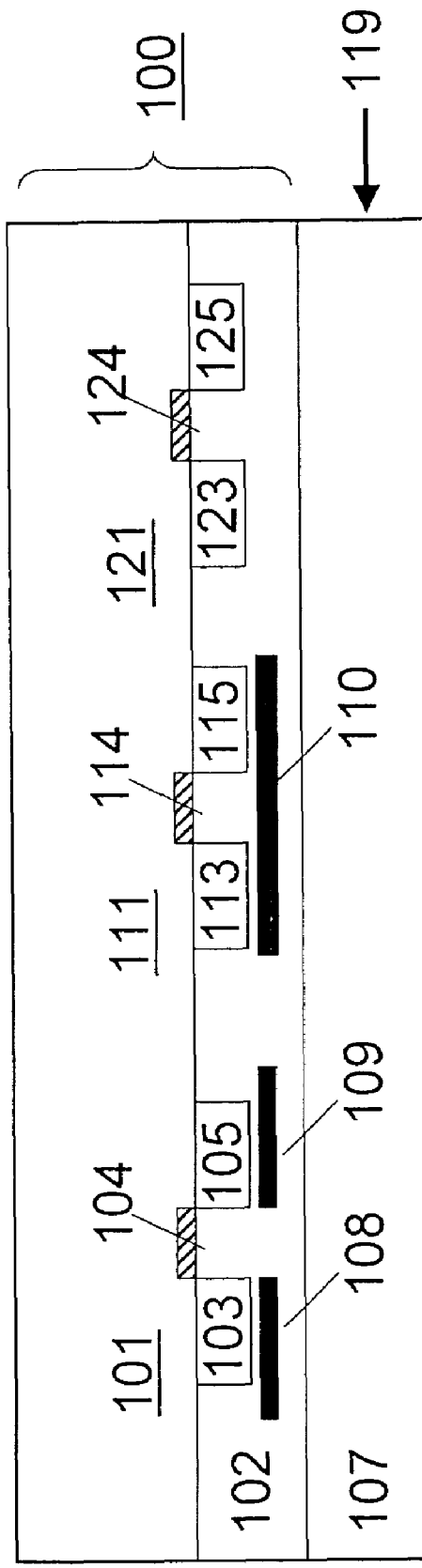
FIG. 1 is a cross-sectional view of an exemplary semiconductor chip in accordance with an exemplary embodiment of the present invention.

An exemplary embodiment of an integrated circuit containing devices, e.g., MOS transistors, that can be adjusted or reconfigured by using photons to alter the carrier density in accordance with the present invention is shown in FIG. 1. In the embodiment illustrated in FIG. 1, an integrated circuit 100 is shown having a semiconductor layer 102. Shown in the semiconductor layer 102 is a first transistor 101, a second transistor 111, and a third transistor 121. It should be understood that the semiconductor layer 102 can contain a large number of transistors; however, for simplicity only three transistors are shown in the semiconductor layer 102 of the integrated circuit 100 in FIG. 1.

Each transistor 101, 111, 121 has a source terminal and a drain terminal. The first transistor 101 has a source terminal 103 and a drain terminal 105, the second transistor 111 has a source terminal 113 and a drain terminal 115, and the third transistor 121 has a source terminal 123 and a drain terminal 125. A channel is formed between the respective source and drain terminals. A first channel 104 is formed between the first source terminal 103 and the first drain terminal 105, a second channel 114 is formed between the second source terminal 113 and the second drain terminal 115, and a third channel 124 is formed between the third source terminal 123 and the third drain terminal 125. The characteristics of the first transistor 101, the second transistor 111, and third transistor 121 are dependent upon the carrier density in their respective channels. The current flowing between the source 103, 113, 123 and the drain 105, 115, 125 through the channel 104, 114, 124 is proportional to the carrier density (per unit area) in the channel 104, 114, 124 and depends upon the length and width of the channel 104, 114, 124 as well as the voltage applied between the source 103, 113, 123 and the drain 105, 115, 125 and between the gate and the channel 104, 114, 124. For small source-drain voltages, the current is typically proportional to the source-drain voltage. For large source-drain voltages, the current is typically dependent only slightly on the source-drain voltage. The number of carriers in the channel depends on several factors, including: (1) the gate voltage; (2) the doping in the channel; (3) the thickness of the gate insulator; (4) the work functions of the semiconductor and the gate electrode; (5) any charges in the insulator or at its interface with the semiconductor, and (6) any charges in the semiconductor within the channel or between the channel and the bulk semiconductor. A number of these parameters control the gate voltage at which significant amounts of current start to flow between source and drain (i.e., the threshold voltage). Charges in the semiconductor, the insulator, or at the interfaces directly change the threshold voltage, and thus affect the current flow.

In the embodiment shown in FIG. 1, a photonic crystal layer 107 is coupled to the semiconductor layer 102 of the integrated circuit 100. The photonic crystal layer 107 is configured to accept light (e.g., photons from a laser) and route the light to a desired location within the integrated circuit 100.

Figure 2:
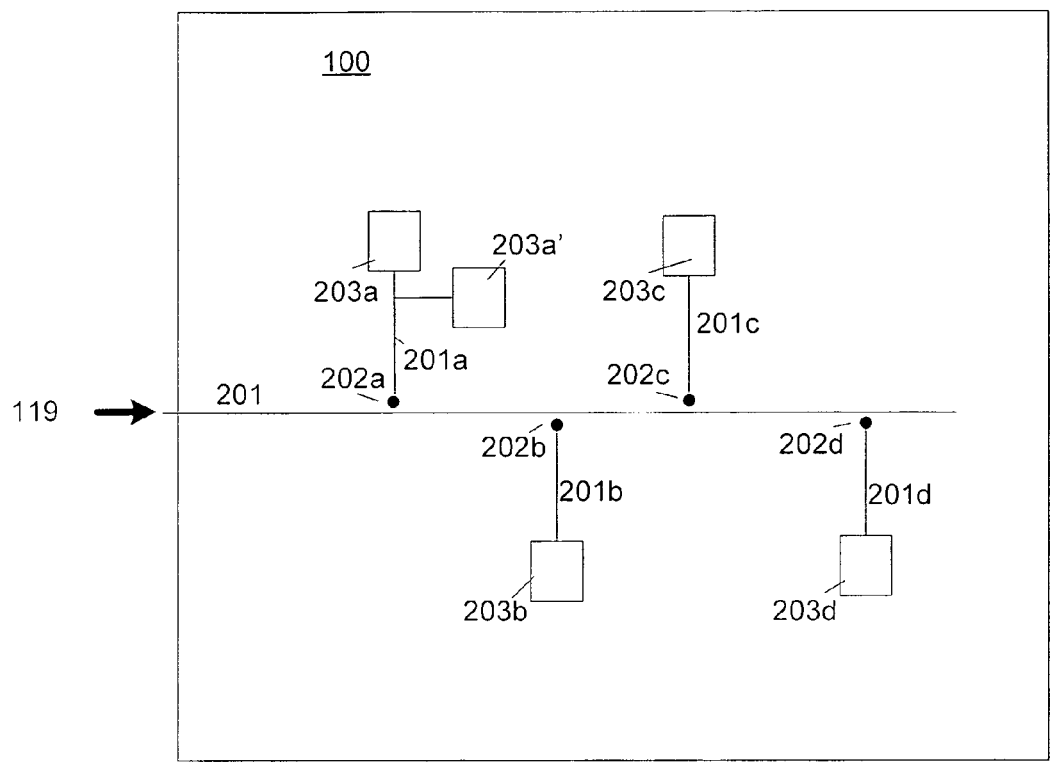
FIG. 2 is a plane view of an exemplary semiconductor chip illustrating optical paths in accordance with an exemplary embodiment of the present invention.

FIG. 2 illustrates a plane view of integrated circuit 100. A waveguide is used to create an optical path 201. In the exemplary embodiment described herein, the optical path 201 is formed using a photonic crystal. Line defects within the photonic crystal create waveguides within the integrated circuit 100. However, alternative types of waveguides may also be used in place of photonic crystals. The optical path 201 directs light (photons) from an entry position 119 to one or more access points 203a, 203a', 203b, 203c, 203d. An access point is the point to which the light is routed via the photonic crystal layer 107 for application to the semiconductor layer 102. For simplicity, five access points are shown in FIG. 2; however, it should be understood that any number of access points could be formed in the photonic crystal layer 107. Additionally, the optical path 201 and its various branches 201a, 201b, 201c, 201d form a branched network to reach the various access points. Each branch can reach one or more access points (e.g., branch 201a creates a path to two access points, 203a, 203a', while branch 201b creates a path to a single access point 203b). Typically, path divisions occur at right angles to each other, but other configurations are possible.

The particular access point to which the photons will travel can be selected by choosing the wavelength of the incident photons. In the exemplary embodiment, point defects in the photonic crystal function as high-Q resonators 202a, 202b, 202c, 202d. It should be appreciated, however, that other types of wavelength filters may be used and would be known to one of skill in the art. In addition, filtering may be performed based on properties other than the wavelength of the photon (e.g., polarization). In the exemplary embodiment, the resonators 202a, 202b, 202c, 202d selectively permit photons to propagate to the access points based on the wavelength of the photon. For example, photons of one selected wavelength will be propagated down branch 201a of optical path 201 at the first resonator 202a, while photons of a different wavelength will not pass through the first resonator 202a into branch 201a. Using the resonators 202a, 202b, 202c, 202d, the path of the photons can be selected to direct the photons to one or more desired access points. Each resonator might be designed to permit propagation of photons of different wavelengths, or alternatively several resonators might permit propagation of photons of the same wavelength. This allows for photons to be applied to numerous devices on the integrated circuit simultaneously.

The access points 203a, 203a', 203b, 203c, 203d correspond to locations of devices within the semiconductor layer 102 (e.g., transistors 101, 111, 121). The photonic crystal acts as a steering mechanism to guide one or more photons from the entry position 119 to a desired access point. Referring again to FIG. 1, one or more masking regions 108, 109, 110 may be formed within or adjacent to the chip 100 during or after the manufacture of the chip 100. The masking regions 108, 109, 110 serve as blocking regions to prohibit photons from reaching specific portions of the semiconductor layer 102. For example, the first source terminal 103 and the first drain terminal 105 are masked by two masking regions 108, 109, thus limiting the ability of photons provided via the photonic crystal layer 107 to reach the transistor 101 to only photons that pass between the masking regions 108, 109. These photons will reach the first channel 104 of the first transistor 101. The second transistor 111 is masked completely by masking region 110, thus allowing photons provided via the photonic crystal layer 107 to be prevented from reaching the second channel 114. No masking region corresponds to the third transistor 121, thus allowing photons provided via the photonic crystal layer 107 to reach channel 124 unimpeded. The ability to mask various regions of the semiconductor layer 102 allows for devices located in close proximity to each other to be individually subjected to photons.

Figure 3:
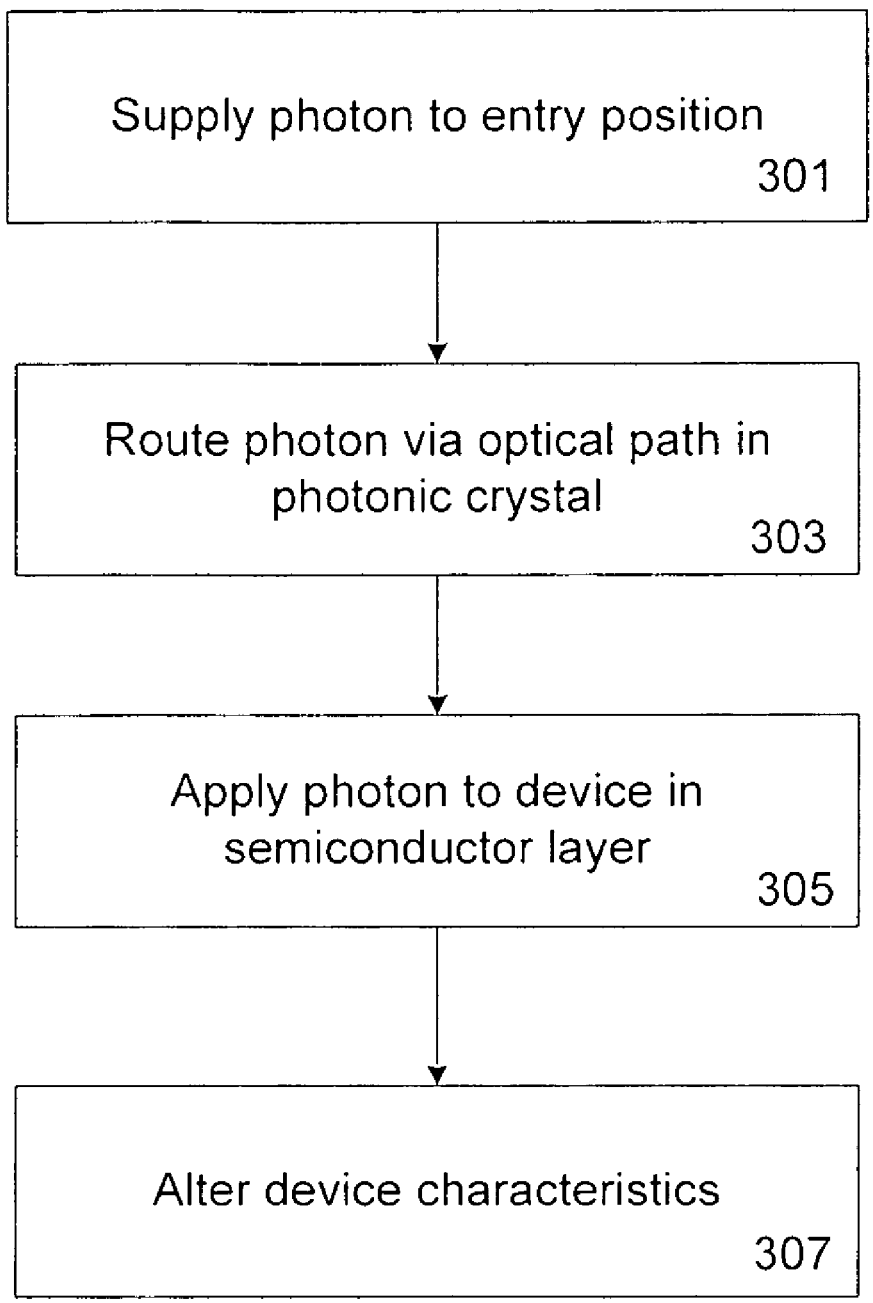
FIG. 3 is a flow chart illustrating the steps involved in practicing an exemplary embodiment of the present invention.

A flow chart is shown in FIG. 3 illustrating the process by which photons supplied to the entry position 119 are used to alter the device characteristics of a device contained within semiconductor layer 102 (e.g., the transistor 101). A light source generates one or more photons, which are supplied to the entry position of the chip (301). The photons typically are generated via a laser coupled to the entry position. Upon entering the chip via the entry position on the photonic crystal layer, the photons are routed via the optical path residing in the photonic crystal layer to an access point (303). The access points in the semiconductor layer correspond with the location of the devices contained within. The photons enter the semiconductor layer at the access point and are incident on a device region within the semiconductor layer, e.g., the channel portion of a transistor (305). The energy carried by the photons is used to alter the device properties (307), for example, the carrier density in the channel.

During the time that the photons strike the device, photons with energy greater than the band gap energy of the semiconductor (eg, 1.1 eV for silicon) excite electrons from the nearly filled valence band to the nearly empty conduction band, generating electron-hole pairs in the semiconductor. If the generation region is near the active region of the transistor, the generated carriers can drift or diffuse to the channel of the transistor or the depletion region separating the channel from the substrate and change the charge densities at these locations. In the channel region, the density of free carriers increases, increasing the conductance of the channel and the current flowing. In the depletion region, the carrier density near the edge of the depletion region increases, modifying the depletion region width and the threshold voltage of the transistor; the change in threshold voltage, in turn, changes the charge density in the channel and the channel conductance at a given gate bias.

In addition to altering the characteristics of devices contained within a chip during the time that the photons strike the device, an additional embodiment of the invention employs the same technique of directing photons to a device via a path in a photonic crystal to modify the device characteristics that exist after the photons cease to be supplied to the device. This allows for devices to be configured to optimize circuit performance or for repair of devices that have become less functional due to damage resulting from trapped charges located in or near the device channel.

Figure 4:
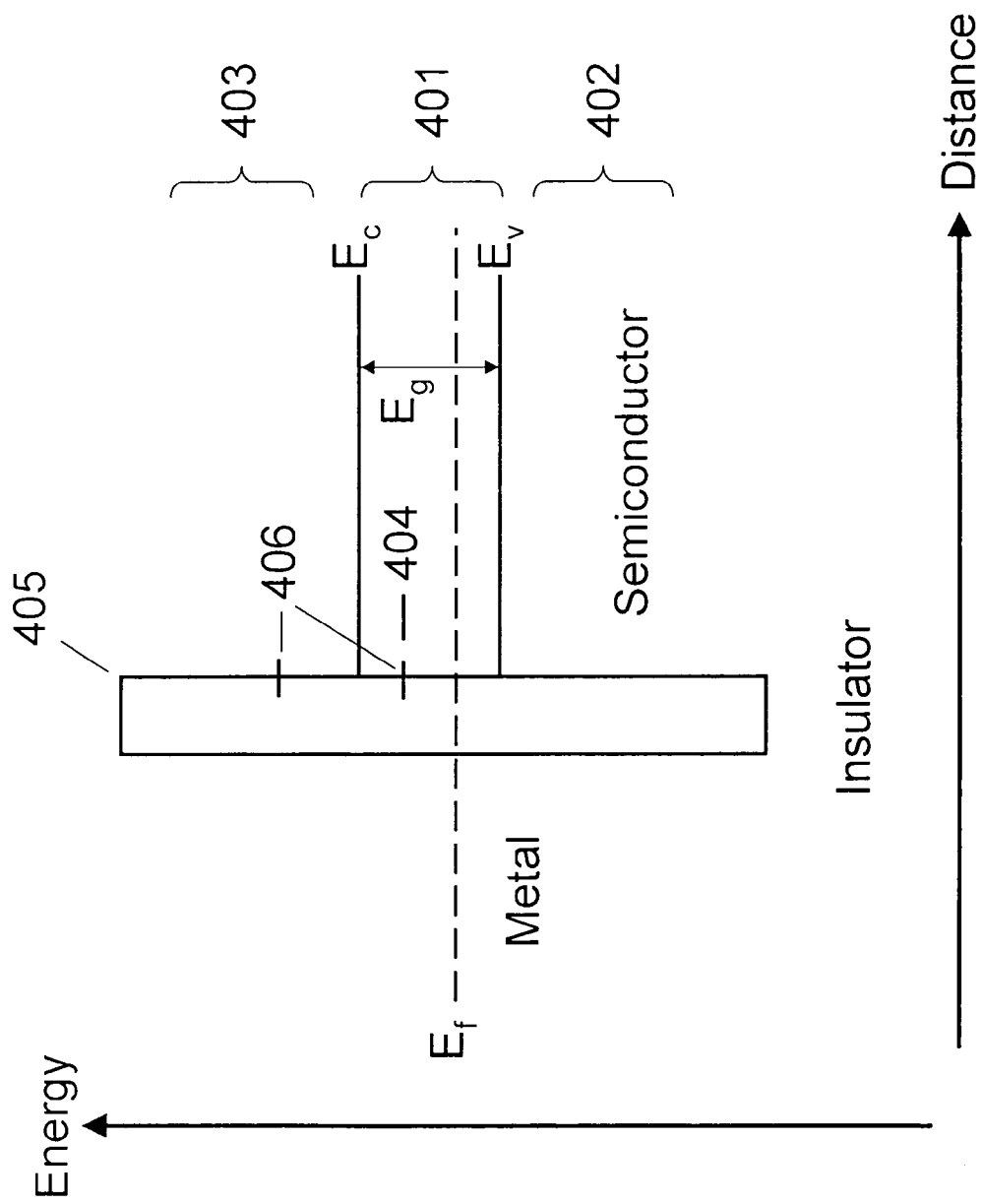
FIG. 4 is an electron energy diagram illustrating locations where charge can be trapped in a device which may be repaired in accordance with an exemplary embodiment of the present invention.

Referring to FIG. 4, an exemplary electron energy diagram of a transistor is illustrated. The band gap $E_g$ 401 of a semiconductor is the energy difference between the top of the valance band $E_v$ 402 (i.e., the highest allowed electron energy that is normally filled at zero temperature (0 deg. K) and with no photons incident) and the bottom of the conduction band $E_c$ 403 (i.e., the lowest allowed electron energy that is normally empty at zero temperature (0 deg. K) and with no photons incident). Thus, the band gap 401 is representative of a difference in energy levels. It should be understood that while the description set forth herein describes electrons, the same principles apply for holes. An electron can become "trapped" in or adjacent to a device channel when a trap 404 exists within the band gap 401 and the energy of the electron is less than the energy of the edge of the lowest allowed empty electron energy level $E_c$. Such trapped charges can impede the performance of the transistor by changing the number of mobile carriers in the channel, by changing the switching speed of the transistor, and, to a lesser extent, by scattering the mobile carriers and decreasing their mobility. Allowed levels of traps 404 within the band gap can also serve as generation-recombination centers, allowing electrons and holes to recombine and modifying the transistor characteristics. Traps located approximately at the center of the band gap are generally most efficient generation-recombination centers, but any trap levels within the band gap are usually deleterious.

In order to repair the transistor, photons may be directed to the channel via the photonic crystal layer, as described above. Photons having energy less than the band gap 401 can provide sufficient energy to the electron trapped at trap 404 such that the electron is raised to an energy within the conduction band, allowing the charge to exit the channel and be conducted away as electrical current. In doing so, the trapped charge is cleared from the transistor channel and the device is repaired or restored to its condition prior to the charge becoming trapped. If the traps are within the depletion region between the channel and the substrate, no mobile carriers are present to repopulate the traps, and the traps remain unoccupied. Photons with energy less than the band gap do not generate electron-hole pairs that would create carriers that would repopulate the traps.

The threshold voltage and transconductance (ratio of change of current in the channel to the change of the control [gate] voltage) for the most common type of transistor—the metal-oxide-semiconductor (MOS) transistor—depend sensitively on charges near the interface 405 between the insulator and the semiconductor and consequently on the traps 406 at this interface. Trapped charge near this interface changes the threshold voltage of the transistor, and traps that can be charged and discharged during normal transistor operation degrade the transconductance of the transistor (i.e., the control [gate] voltage becomes less effective in modulating the number of mobile carriers in the transistor channel and therefore is less effective in modulating the current flowing in the channel.) Many of the interface traps arise from terminating the crystal lattice of the semiconductor at its interface with the amorphous gate insulator. During device operation, energetic species and radiation, for example, can generate additional traps at the interface. Electrons can then be trapped at these sites changing the transistor properties during extended operation or operation in a harsh (e.g., outer space) environment. In addition, during manufacturing, some of the traps at the interface which cannot be removed are conventionally passivated (i.e., made ineffective), for example by terminating the unsaturated bonds at the interface with hydrogen atoms, and are not electrically active to capture electrons from the channel. During operation, some of the hydrogen can be lost, reactivating these interface traps. The interface traps may be neutral when empty, in which case they will not modify the threshold voltage of the transistor until a charge is trapped. Excited carriers resulting from the harsh environment or extended operation may have enough energy to access the trap and become immobilized. The charge on the trapped carrier modifies the threshold voltage of the transistor and may also cause additional scattering of mobile carriers flowing in the channel.

Photons incident on the device can excite the trapped electrons out of the traps so that they can be transported out of the device by drift and diffusion. The traps then become neutral again, removing their effect on the transistor performance. If the energy of other carriers present in the device is low compared to the energy of the traps, additional carriers will not be trapped, and the empty traps remain neutral unless charged by external sources, such as energetic particles resulting from a space environment.

Alternatively, the traps may be charged when empty, so that this charge is designed into the characteristics of the transistor. When a carrier is trapped, the charge on the trap changes (either increasing or decreasing), with the associated change of the transistor characteristics. As before, removing the carriers from the traps by photons of the proper energy allows them to leave the device and causes the device to regain its initial characteristics.

In addition to removing the effect of damage on the electrical characteristics of the device, the characteristics can be purposely modified by using a controlled number of photons to introduce a specified amount of charge into the interface traps or to remove a specified amount of charge already in the interface traps. The energy of the incident photons can be adjusted to control whether charge is introduced or removed.

In addition to changing the number of trapped charges, the incident photons can interact with the physical structure. For example, photons of a suitably selected energy can repair structural damage, such as broken bonds within the semiconductor.

The modification or adjustment of the characteristics of a transistor by inserting or removing trapped charges can be performed in very short intervals of time. Additional carriers in the channel can typically be generated rapidly (e.g, in under a microsecond), and carriers can be rapidly removed or cleared from the channel in a time that is still small (e.g., under a millisecond).

Thus, by applying photons to the device channels to alter the carrier densities or to modify trapped charges, device characteristics can be dynamically altered at a time after the manufacturing process. Additionally, the techniques in accordance with exemplary embodiments of the invention allow for adjustment of device characteristics (or device repair) initially or periodically during circuit operation. It is possible to initially apply photons in the manner described herein to ensure consistency with the desired device characteristics, thus optimizing the characteristics for the circuit application and also alleviating the concern created by the increasingly large statistical variations caused in the manufacture of devices with continually decreasing dimensions. In addition, it is possible to periodically apply photons to adjust transistor characteristics, such as switching speed and current leakage to optimize devices for a particular circuit application. For example, some applications require the fastest switching speed possible, at the expense of higher leakage current and power dissipation; other applications require low power dissipation at the expense of the highest switching speed. It is also possible to apply photons to remove trapped interface charges occurring during extended operation or operation in a harsh environment or to repair structural damage created during extended operation or operation in a harsh environment.

A variety of modifications to the embodiments described will be apparent to those skilled in the art from the disclosure provided herein. Thus, the present invention may be embodied in other specific forms without departing from the spirit or essential attributes thereof and, accordingly, reference should be made to the appended claims, rather than to the foregoing specification, as indicating the scope of the invention.

What is claimed is:

1. An apparatus comprising:
   an integrated circuit having a plurality of devices each having device characteristics; and
   a waveguide structure coupled to said integrated circuit;
   wherein photons provided to said waveguide structure are directed to one or more devices of said plurality of devices and can alter said device characteristics of said one or more devices, wherein said photons are selectively directed to distinct devices from said plurality of devices, and wherein a filter selectively directs said photons and wherein the filter-comprises a wavelength filter, and wherein the filter comprises a resonator.

2. The apparatus as set forth in claim 1, wherein said resonator is formed using a photonic crystal.

3. The apparatus as set forth in claim 1, wherein said waveguide structure comprises a photonic crystal.

4. The apparatus as set forth in claim 1, wherein said device characteristics comprise threshold voltage.

5. The apparatus as set forth in claim 1, wherein said device is a transistor.

6. The apparatus as set forth in claim 5, wherein said transistor is a MOS transistor having a source terminal, a drain terminal, and a channel.

7. A method for altering device characteristics comprising:
   providing photons to an integrated circuit having a plurality of devices via a waveguide structure;
   wherein photons provided to said waveguide structure are directed to one or more devices of said plurality of devices and can alter said device characteristics of said one or more devices, wherein said photons are selectively directed to distinct devices from said plurality of devices, and wherein a filter selectively directs said photons, and wherein the filter comprises a wavelength filter, and wherein the filter comprises a resonator.

8. The method as set forth in claim 7, wherein said resonator is formed using a photonic crystal.

9. The method as set forth in claim 7, wherein said waveguide structure is a photonic crystal.

10. The method as set forth in claim 7, wherein said characteristics comprises threshold voltage.

11. The method as set forth in claim 7, wherein said device is a transistor.

12. The method as set forth in claim 11, wherein said transistor is a MOS transistor having a source terminal, a drain terminal, and a channel.

13. An apparatus comprising:
    an integrated circuit having a plurality of devices each having device characteristics; and
    a waveguide structure coupled to said integrated circuit;
    wherein photons provided to said waveguide structure are selectively directed to one or more devices of said plurality of devices by a resonator wavelength filter and can alter said device characteristics of said one or more devices, and
    wherein said photons are selectively directed to distinct devices from said plurality of devices.

14. The apparatus as set forth in claim 13, wherein said waveguide structure comprises a photonic crystal.

15. A method for altering device characteristics comprising:
    providing photons to an integrated circuit having a plurality of devices via a waveguide structure;
    wherein photons provided to said waveguide structure are selectively directed to one or more devices of said plurality of devices by a resonator wavelength filter and can alter said device characteristics of said one or more devices, and
    wherein said photons are selectively directed to distinct devices from said plurality of devices.

16. The method as set forth in claim 15, wherein said resonator is formed using a photonic crystal.

* * * * *

UNITED STATES PATENT AND TRADEMARK OFFICE
CERTIFICATE OF CORRECTION

PATENT NO. : 7,545,999 B2 Page 1 of 1
APPLICATION NO. : 11/264206
DATED : June 9, 2009
INVENTOR(S) : Philip J. Kuekes et al.

It is certified that error appears in the above-identified patent and that said Letters Patent is hereby corrected as shown below:

In column 7, line 51, in claim 1, delete "filter-comprises" and insert -- filter comprises --, therefor.

Signed and Sealed this

Thirtieth Day of March, 2010

David J. Kappos
*Director of the United States Patent and Trademark Office*